Jan. 19, 1965    O. M. ARNOLD ETAL    3,166,082
INDUSTRIAL PARTS WASHER
Filed March 6, 1962    3 Sheets-Sheet 1
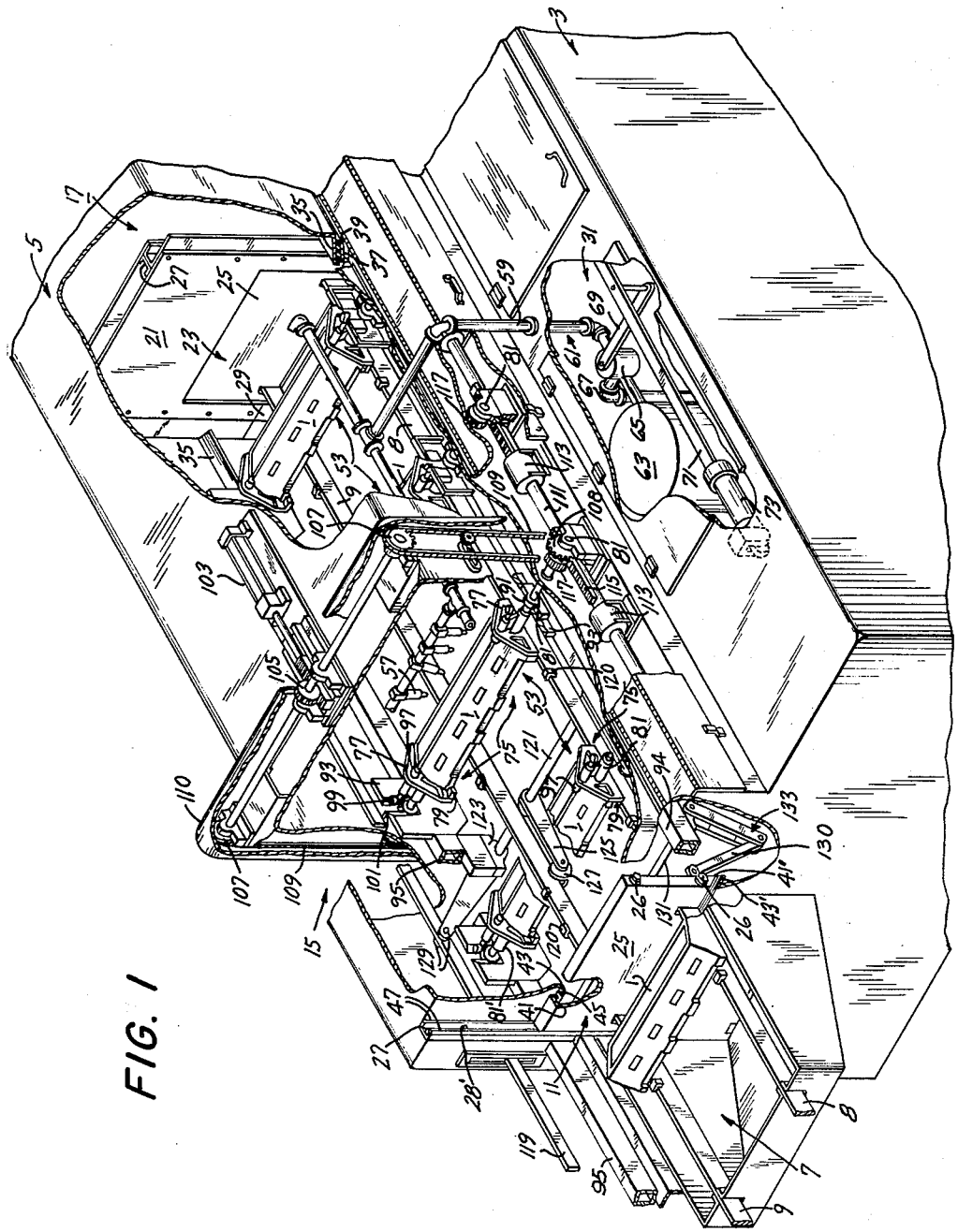
FIG. I
INVENTORS
DEWEY M. EVANS
ORLAN M. ARNOLD
BY
Curtis, Morris + Safford
ATTORNEYS Jan. 19, 1965

O. M. ARNOLD ETAL 3,166,082

INDUSTRIAL PARTS WASHER

Filed March 6, 1962

INVENTORS
DEWEY M. EVANS
ORLAN M. ARNOLD

BY

Curtis, Morris & Safford
ATTORNEYS

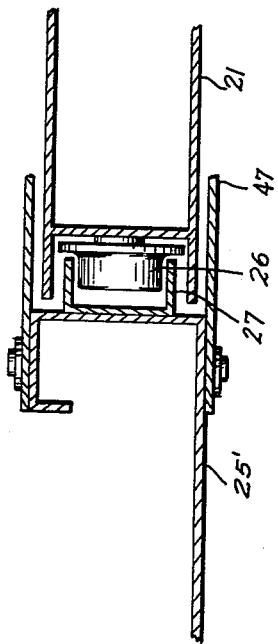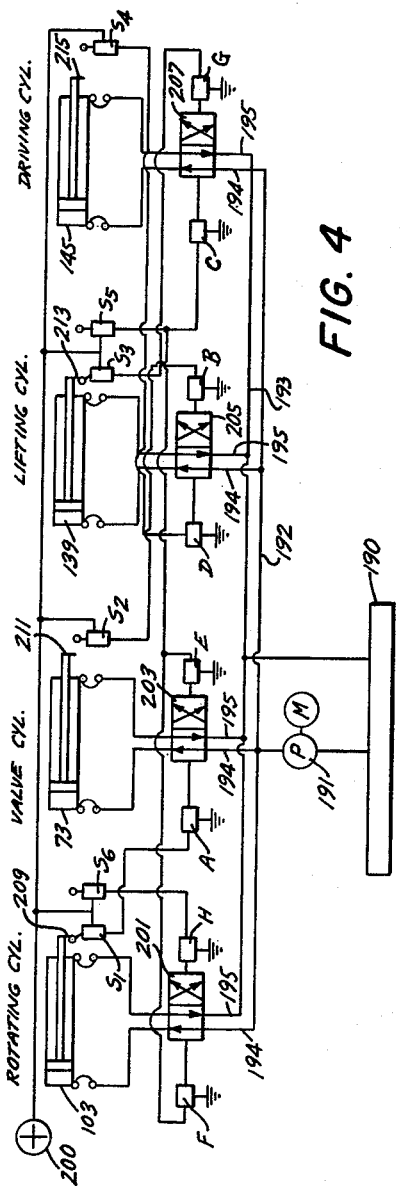

United States Patent Office 3,166,082
Patented Jan. 19, 1965

3,166,082
INDUSTRIAL PARTS WASHER
Orlan M. Arnold, Grosse Pointe Park, and Dewey M. Evans, Pinckney, Mich., assignors to Ajem Laboratories, Inc., Livonia, Mich.
Filed Mar. 6, 1962, Ser. No. 177,907
11 Claims. (Cl. 134—78)

This invention relates to power washer apparatus and, more particularly, to new and useful improvements in power washer apparatus for castings and large parts used in the automobile industry and the like.

Power washer apparatus are generally employed to remove surface contaminants, e.g. soils, cutting oils, etc., which have accumulated on parts during a manufacturing process. In such apparatus, the manufactured parts are carried, for example, by conveyor-type mechanisms along various processing sections wherein they are subjected to high speed jets of washing liquid, e.g., aqueous detergent solutions and then to a blow-off with air in successive phases, e.g. wash, flush, and blow-off.

Due to the high velocity of these jets, large quantities of the chemical solutions are atomized, vaporized and deflected within the power washer apparatus. These vapors and vagrant sprays tend to escape from the apparatus and also to migrate between the various processing sections. This type of situation may create an unhealthy working atmosphere, and also makes trouble with the manufacturing processes. For example, such vapors may condense on, and cause oxidation of, the metallic surfaces of other adjacent apparatus. Droplets of solution may dry on machinery and cleaned parts and moist films resulting from such condensation of droplets collect dust and soil from the air to leave dirty surfaces where they should be clean.

This invention, therefore, is particularly directed to improved power washer apparatus wherein vapors and liquid sprays produced during the active treating phase of a processing cycle are positively confined at each of the processing sections. It is also an objective to keep the apparatus accessible for cleaning, servicing, adjustment, or modification when different parts are to be cleaned.

In one embodiment of a power washer apparatus which illustrates the principles of this invention, a line of parts to be washed in sequence are transferred by automatic indexing mechanisms simultaneously to the next successive positions along a series of processing sections. These processing sections are under a removable, upper housing portion of the power washer apparatus, and between partition members, each with a transfer port disposed on the progression path of said parts and normally sealed by a sliding panel member. The operation of these panel members is synchronized with the indexing of the parts whereby the parts can pass through the ports to advance along said path. The treating elements in the respective processing sections are advantageously inactivated during the indexing phase of the processing cycle. When the parts have been advanced, these panel members are again closed and the treating elements in the respective processing sections are activated, so that the active treating is effected within sealed processing compartments.

Each part is end-supported and rotated during the active treating phase of the processing, the treating cycle is accurately time-controlled to insure proper treatment of the individual parts as they pass through the power washer.

Numerous advantages result from the effective sealing and isolation of the processing sections during the active treating. Accordingly, the usual tunnels or isolation sections between the processing sections is eliminated and the dimensions of the apparatus may be substantially reduced, with important economy of valuable plant space, and corresponding reduction in transport time. Moreover, as the upper housing is removable from the power washer, ready access is had to each of the processing sections for maintenance and modification, etc.

In this specification and the accompanying drawings, we have shown and described various embodiments of our invention; it is to be understood, however, that these are not intended to be exhaustive of the numerous applications to which this invention is susceptible. These embodiments have been selected and included for purposes of illustration in order that persons skilled in the art will more fully understand the principles of this invention so as to be enabled to further modify it and embody it in a variety of forms, each as may be best suited to the conditions of a particular use.

In the accompanying drawings:

FIGURE 1 is a perspective view of one end of a power washer apparatus in accordance with this invention partially broken away to expose interior parts and to show certain parts in section;

FIGURE 2 is a vertical sectional view taken along the center axis, respectively, of power washer apparatus in accordance with this invention;

FIGURE 3 is a fragmentary horizontal sectional detail through one side of a door and adjoining frame;

FIGURE 4 is an electrical and hydraulic circuit diagram of a control system which may be employed in the practice of this invention.

FIGURES 5, 6 and 7 illustrate various seals which may be used for example, between the upper housing and the base tank according to this invention;

FIGURE 8 is a graphic representation of the sequence of movements produced by the indexing mechanism employed in the power washer apparatus of FIGURES 1, 2 and 3.

Referring now to FIGURE 1, a power washer apparatus in accordance with this invention comprises a base tank portion 3 as the lower housing and an upper housing 5 above it. The parts 1 to be processed, herein illustrated as automobile engine heads, are received at a loading apron 7 outside the upper housing 5 upon transfer bars 8 and 9. These transfer bars serve for indexing in the power washer apparatus, hereinafter, described, to carry parts 1 in turn through an entry port 11 and a number of processing sections within the upper housing 5, and discharges them, fully washed, through an oppositely disposed exit port 13. (See FIGURE 2 and 3.) Each bar has lugs 120 to prevent slipping of the bars when they move against the inertia of parts carried thereon.

In FIGURE 1, processing sections, such as, washing section 15, flushing section 17 (partially shown in FIGURE 1), and blow-off section 19 (not shown in FIGURE 1, see FIGURE 2) are defined within upper housing 5 by hollow partition members 21, respectively. Each partition member 21 has a transfer port 23 aligned with entry port 11 and exit port 13. Entry port 11, exit port 13 and transfer ports 23 are normally sealed by sliding panel doors 25 and 25', respectively, positioned in and movable on wheels 26 along vertical guide frame members 27. Each panel 25 is slotted along its base edge so as to pass transfer members 8 and 9 when closed. Panels 25 are elevated and lowered synchronously with the indexing of parts 1, so as to open a path for them through parts 11, 13 and 23 from one to another of processing sections 15, 17 and 19.

Hollow partitions 29, corresponding to partitions 21, extend down into tank 3 defining bins 31, 32 and 33, being the lower parts of the processing sections. Bins 31 and 32 contain the respective liquids for the treatments in the several sections 15, 17, 19, e.g., chemical solutions for removing surface contaminants from parts 1 during the washing and clear water for flushing.

To provide easy access within the power washer apparatus for adjustment and maintenance purposes, as well as modification for washing different parts, upper housing 5 is seated and sealed on tank 3 by a novel flange arrangement. As shown in the broken-out section of FIGURE 1, a pair of downwardly-extending flange members 35 and 37 are supported along the lower edge of upper housing 5 and the upper rim of tank 3, respectively. When upper housing 5 is positioned for operation, flanges 35 and 37 mate to compress therebetween a resilient gasket 39 to control leakage through the joint.

Substantially similar inwardly and downwardly-extending, mating flanges 41 and 43, are provided at the top and bottom edges of the entry port 11 and exit port 13. If the bottom edges of entry port 11 and exit port 13 are continuous with the rim of tank portion 3, a continuous peripheral flange member 37 is utilized in lieu of separate flanges 43.

When doors 25 are closed, the pairs of flanges 41 and 43 mate to compress gaskets 45 longitudinally along the respective flange member 43.

Resilient sealing strips 47 (see FIGURE 3) are positioned along the respective channels 27 to control leakage along the sides of panels 25 whereby upper housing 5 is effectively sealed.

FIGURES 5, 6 and 7, employing similar numerical designations, show other flange seals which may be employed for either the rims 37–39 or the doors 25. In each of these figures, flanges 35 and 37 are turned downwardly to provide good drainage.

An alternative sealing arrangement is shown in FIGURE 2 with respect to the centrally-disposed partitions 21 vis-a-vis the tank partitions 29. In this arrangement, inverted V-shaped members 50 having resilient gaskets 49 along their external apex portions are provided at the upper edges of the hollow partition members 29 and mating V-bottoms on doors 25', at the base of the transfer ports 23.

Wipers 52, positioned along the inside faces of each of the ports 23 on partitions 21 control leakage between adjacent processing sections along the top edge of panels 25'.

When doors 25 are lowered along the respective guide channels 27, each of the entry port 11, exit port 13 and transfer ports 23 is positively sealed, whereby processing sections 15, 17 and 19 are effectively compartmentalized. Vapors and spatter of the liquids used during the active treating phase collect and drain into bins 31, 32 and 33. Exhaust apparatus may be provided for the various processing sections 15 and 17 to drain off vapors and fine spray from the apparatus and to control their escape while the panels 25 are elevated. Such exhaust devices are, of course, used with section 19 to carry off the air blown in through jets 58 and the vapors and mists produced by the blow off. As the upper housing 5 is seated and held by gravity on tank 3 only by these flanges, it can be quickly lifted clear, whereby the component elements of the washing section 15, flushing section 17 and also the blow-off section 19, are readily accessible for servicing, replacement, etc.

In order that flange members 41 and 43 along the top edges of entry port 11 and exit port 13 and corresponding panels 25, respectively, do not impede the lifting off of upper housing 5, the respective outer guide channels 27 are adapted to pivot outwardly about their base extremities on pivot pins 28 (see FIGURE 2), mounted in the walls of upper housing 5, and are held in upper housing 5 by removable locking pins 28'. When upper housing 5 is to be elevated, locking pins 28', are withdrawn and channels 27 are pivoted to swing the respective doors 25, outward and disengage the upper flanges 41 and 43. The doors 25 are held in the channels 27, by linkage 133, connected to operate the doors 25 and hold them up while the upper housing 5 is lifted. Brackets may be provided on each of the partitions to support the panel and guides while upper housing 5 is elevated. When upper housing 5 is again lowered onto the tank 3, the channel frames 27 are repositioned thereon and locking pins 28' reinserted.

Alternatively, the linkage 133 can be disconnected from the panels 25, and upper housing 5 is then lifted with the panels remaining in place.

As shown in FIGURE 2, washing section 15 and flushing section 17 each includes a number of stages 53 and 55, respectively; whereas blow-off section 19, in this embodiment, has a single stage 20. Only the washing stages 53 are included in the portion of the apparatus shown in FIGURE 1, and only one of the jet manifolds with its nozzles 57 is shown. These manifolds are positioned transversely within the upper housing 5, and similar manifolds, with jets appropriately directed, are provided at each stage in sections 15 and 17. A plurality of air nozzles 58, are similarly arranged on a manifold in the blow-off stage 20 and are supplied with air under pressure.

Bins 31 and 33 may open into base tank 3 for a common source of liquid or each may store a supply of washing or flushing liquid to be pumped, respectively to the washing stages 53 and flushing stages 55 along liquid conduit systems 59. The liquid supply system 61 is shown as comprising a high pressure, high capacity pump 63 (see FIGURE 1) having its impeller section immersed within tank 3 or the liquid storage bins 31 or 33, respectively. The liquid used in the washing section will advantageously be an alkaline aqueous solution provided with detergents; and, for flushing liquid, clear water; but these materials have been developed for such use and may be selected by known criteria. These liquids are supplied, respectively or one to both sections 15 and 17, through piping system 59. If different liquids are used, each system 59 will have its own pump and diverting valve.

The liquid is fed along the respective pipes 59 to the washing stages 53 or flushing stages 55 and ejected as high velocity jets from nozzles 57.

Each liquid conduit system 61 includes a valve 65 which is controlled to direct the liquid along pipe 59 to the headers for the jets 57 in the sections 15 or 17 or to divert it to the liquid supply along a by-pass pipe 67. The control arm 69 of each diverting valve 65 is connected by a rod 71 to a hydraulic motor 73. When doors 25 are open and parts 1 are being advanced, motor 73 is extended to divert the liquid along the by-pass pipe 67, so that the jets are inactivated.

During the active treating, parts 1 are supported by cradles 75 at each of the washing stages 53 and flushing stages 55 and also at the blow-off stage 20. Each cradle 75 comprises a pair of oppositely disposed, substantially triangular supports 77; each support includes an inwardly extending seating flange 79 at its bottom edge to engage and support the particular configuration of parts 1, e.g., as shown, an automobile engine head.

Supports 77 are mounted on rotatable stub shafts 81, 81' which are journaled at 91 on fixed frame members 94 and 95. Cam plates 93 also fixed on the frame members 94 and 95 at each end of each cradle 75 are oppositely disposed at the several treating positions of parts 1.

Locking pins 97 are provided on each pair of support members 77 which, when extended, lock parts 1 onto the respective seating flanges 79. These locking pins 97 are spring pressed so that they can be withdrawn when the respective support members 77 are respectively in normal position, as shown. When the support members 77 are in normal position, camming wheels 99 on the outer ends of locking pins 97 are in slots 101 and cam plates 93; but when the support members 77 are rotated, camming wheels 99 ride up the beveled sides of slots 101, to extend pins 97, into locking engagement over the parts 1. When cradles 75 are inverted, parts 1 are held by pins 97 and camming wheels 99 ride along the faces of plates 93 to maintain pins 97 extended, so that the parts 1 are securely retained.

The pairs of support members 77 are simultaneously rotated in phase by a hydraulic motor 103 mounted on top of upper housing 5. Cylinder 103 drives a rack and pinion 105, and through it and the sprockets 107 and chains 109, and sprocket 108 on one of the stub shafts 81 associated with the cradle structures 75, it drives push pull shaft 111. These parts may be enclosed in a housing 110.

In this illustrative embodiment, driving chains 109 must be disconnected, in addition to guide channels 27 being swung outwardly, as hereinabove described, when upper housing 5 is to be lifted from tank 3.

Pinion gears 117 mounted on the shafts 81, respectively, engage with gear racks 115 disposed along driving rods 111. Driving rods 11 are supported at opposite sides of upper housing 5 by bearings 113. Accordingly, cylinder 103, when extended and retracted, concurrently drives rods 111 back and forth to rotate the pairs of support members 77, in phase thus rotating them with no strain on parts 1 supported therein.

Except for the small areas at their ends which engage the supports 77 and pins 97, the entire surface of the parts 1 are subjected to the washing, flush down and/or grit blasting or the like treatment at 15 and 17, and also to blow off by jets of air ejected from air nozzles 58.

In normal operation, parts 1 are placed on the transfer bars 8 and 9 over the apron 7 outside the door 25 and are transferred to successive cradles in turn, through entry port 11, and transfer ports 23, and eventually are discharged from exit port 13. During each transfer, the processing sections 15, 17 and 19 are inactivated. During each active treating phase, while the transfer mechanism is inoperative, each of these ports are effectively sealed by the doors 25, respectively, and the sealing strips at their edges.

This synchronized operation of the panels 25 and the indexing mechanism is effected by lift bar 119 pivotally connected to the upper ends of arms 129, 130 and 161, if used. This elevates and lowers each of the panels 25 in phase with the unseating and seating, respectively, of parts 1 from and into the cradle 75 by transfer members 8 and 9.

Transfer members 8 and 9 are given a rectilinear walking-type movement wherein the horizontal and vertical components of motion are separated and in a sequence, whereby (1) each of the parts 1 is unseated and elevated from its cradle 75, (2) each of the parts is carried forward and accurately positioned over a next successive cradle 75, (3) each of the parts 1 is lowered onto the next successive cradle 75, and bars 119 continue downward until clear of the parts 1 and adjacent structures; and (4) the transfer members 8 and 9 reciprocate back to the starting point ready for the next indexing operation. This sequence is graphically illustrated in FIGURE 8 and reference thereto will aid in more fully understanding the peculiar operation of the power washer apparatus of this invention.

As shown, the indexing mechanism comprises a pair of transverse shafts 121 supported at opposite ends of tank 3 in bearings 123 mounted on the underside of frame members 94 and 95, respectively. (See FIGURES 1 and 2.) A pair of lifting arms 125 are keyed on each transverse shaft 121 and carry rollers 127 having peripheral receiving frame members 8 and 9, respectively. Shafts 121 extend slightly beyond the bearings 123, respectively, and support on their exterior ends driving arms 129, respectively, which are pivotally connected to lift bar 119 (see FIGURE 1).

Lift bar 119 is connected by similar driving arms 130 (see FIGURE 2) to other transverse shafts 131 supported in similar bearings 123 adjacent to panels 25, respectively. An elbow linkage 133 with one arm keyed to the exterior end of transverse shaft 131; and another link connected by a clevis to the base of each panel 25, is advantageously driven by an arm 130 from the push-pull rod 119. Linkage arm 133 connected to the door for the exit port 13 is driven through a reversing gear 137 so that the same arm 130 can lift doors 25 and 25' on opposite sides of it.

The elevating and lowering of frame members 8 and 9 and doors 25 is effected by the hydraulic cylinder motor 139. (Steps 1 and 3, respectively, as shown in FIGURE 8). Cylinder 139 is pivotally connected at one end to a fixed abutment 141 and its other end is connected to lift bar 119. When the cylinder 139 is retracted, it pulls lift bar 119 and through it pulls on the arms 129, 130 and 161 to rotate their transverse shafts 121, 131 and 160 respectively.

Step 1.—Transverse shafts 121, on rotating, force lifting arms 125 to turn in a clockwise direction and lift transfer bars 8 and 9 so as smoothly to lift and support parts 1 clear of cradles 75. Retaining lugs 120 equally spaced along transfer bars 8 and 9 precisely locate each of the parts 1 on these bars. Concurrently, the rotation of shafts 131 force the respective linkage arms 133 to move door panels 25 up along guide channels 27.

An hydraulic cylinder motor 145 is advantageously used to control the longitudinal displacement of the transfer members 8 and 9. The connecting rod 147 is slidably fitted in a vertical slot 149 in a bracket arm 151 depending from each of the transfer members 8 and 9. While transfer members 8 and 9 are elevated and lowered by lift bar 119, as hereinabove described, the pivot of connecting rod 147 slides freely along slot 149 and prevents any horizontal motion as long as cylinder 145 is immobile.

When cylinder 139 is retracted, and with it transfer members 8 and 9, each door 25 is fully elevated; whereupon cylinder 145 extends to push transfer members 8 and 9 horizontally on guide wheels 127. The stroke of cylinder 145 is such as to precisely locate each part 1 above the next succeeding cradle 75.

Step 2.—Retaining stops 120 hold parts 1 against slippage along transfer members 8 and 9 as they are indexed forward along chamber 5.

While cylinder 145 is thus extended, cylinder 139 extends to return the lift bar 119. This returns lifting arms 125 to their initial position and lowers transfer members 8 and 9 to a normal level, below cradle structures 75 whereby parts 1 are smoothly received and accurately seated on flanges 79 of the next successive cradle structure 75.

Step 3.—Concurrently, the return of lift bar 119 also returns linkage arms 133 thereby lowering doors 25 and closing ports 11, 13 and 23.

With the processing sections 15, 17 and 19 thus closed treatment of the parts 1 can be initiated. To this end, drive cylinder 145 retracts to pull transfer bars 8 and 9 along on the guide wheels 127 and through slots 152 in the now-closed doors 25.

Step 4.—Concurrently, cylinder 73 retracts to restore valve 165 to a position in which the pumped liquid is supplied to the system 59 of washing stages 53. Similar motors and valves likewise are activated to supply liquid to the flushing stages 55 and air to the blow-off stage 20.

When each of the processing stages has been activated, cylinder 103 reciprocates driving the rack and gear 105 and connected drive elements, hereinabove described. Each of the cradles 75, therefore, are rotated to fully expose the surfaces of parts 1 to the jet streams of chemical solutions and air, ejected from nozzles 57 and air nozzles 58 respectively.

Cylinder 103, when retracted, completes the active treating phase of the processing cycle, and also returns each of the cradles 75 to its first position, where the locking pins 97 are retracted leaving the parts 1 free to be lifted and stepped ahead.

Cylinder 73 now extends to force its connecting rod 71 to the position in which valve 65 by-passes liquid away from the washing stages 53, flushing stages 55, and air from the single blow-off stage 20.

A next successive indexing phase is initiated upon the retraction of cylinder 139 to draw lift bar 119 (Step 1) so as to initiate the advance of each part 1 to the next successive processing stage.

In a power washer apparatus shown in FIGURE 2 (not shown in FIGURE 1), inner hoods 153 have been included in sections 15, 17 and 19, respectively. This is not essential but has advantages. Partition members 155 are positioned at intervals within the hood 153 to define individual compartments 154 for washing stages 53 and flushing stages 55, respectively; the single processing stage shown for blow-off section 21 includes a single-compartment, hood 153. The hoods 153 are adapted for vertical movement along the guide channels 159, respectively, and, when fully lowered, enclose the cradle structures 75 at each of the washing stages 53, flushing stages 55 and the single blow-off stage 20. The shovel-nozzles 57 and air nozzles 58 are supported high within the individual compartments 154, respectively, of hoods 153.

Each of the hoods 153 is elevated and lowered synchronously with panels 25 and the indexing mechanism. Each hood 153 is connected by a clevis to a linkage arm 157 fixed to a transverse shaft 160. Shafts 160, supported in bearings 163 beneath the frame members 94 and 95, are connected to driving arms 161, which in turn are pivotally connected to lift bar 119. When lift bar 119 is drawn and returned by cylinder 139, hoods 153 are elevated and lowered along guide channels 159 synchronously with panels 25 and transfer members 8 and 9 so as to allow the progression of the parts 1 along the power washer apparatus, as hereinabove described. So as not to impede the elevation of the hoods 153, pipe systems 59 and also the air conduit system, not shown, include flexible sections 162. (Latter not shown in FIGURE 1 since hoods 153 are not used in the embodiment shown.)

*Automatic control system for indexing operation*

An automatic, accurately timed operation of the power washer apparatus hereinabove described is advantageously effected by a hydraulic control system substantially as shown in FIGURE 4. In the interest of simplification fluid connections and also solenoid-operated control valves 201, 203, 205 and 207 associated with rotating cylinder 103, valve cylinder 73, lifting cylinder 139 and driving cylinder 145, respectively, have been shown schematically; the arrows included within each of the control valves indicate the particular cross-connections effected in response to the energizing of solenoids A through H, respectively.

The hydraulic control system of this invention includes a liquid-pressure reservoir 190 from which the hydraulic fluid is drawn and pumped into a pressure manifold 192 by pump 191, and, after use in the various control cylinders, is returned to the reservoir through a return manifold 193. The pressure manifold 192 and the return manifold are connected to each of the various control motors by hose connections 194 and 195. The control valves 201, 203, 205 and 207 are interposed in hose connections 194 and 195 so as to reverse hydraulic fluid flow to retract the respective hydraulic motors.

Assume for purposes of description that an active treating phase of the power washer apparatus has been completed and the panel members 25 of FIGURES 1, 2 and 3 and/or liftable inner hoods 153 of FIGURE 2 are still in a fully lowered position.

When the cylinder 103 has retracted to complete the active treating phase, a flange 209 carried on its connecting rod engages and operates switch S1 to complete an energizing path for solenoid A from source 200. Solenoid A, when energized, operates control valve 203 to extend valve cylinder 73 to force the control arms 69 of valves 65 forward. Treating liquid directed along the individual liquid conduit systems 61 are thus diverted through valves 65, respectively, along by-pass pipes 67, respectively, to solution bins 31 and 33, etc. respectively; also, the air-pumping equipment, not shown, may be inhibited. At this time, washing stages 53, flushing stages 55 and also blow-off stage 20 are inactivated so that vapors and spray are not being generated within the power washer apparatus.

When the valve cylinder 73 is fully extended, flange 211 carried on its connecting arm engages and operates switch S2. Switch S2 completes an energizing connection for solenoid B which, when energized, operates control valve 205 to retract lifting motor 139. As lifting motor 139 retracts, it pulls smoothly back the lift bar 119 to simultaneously elevate transfer members 8 and 9 and also the door panels 25 and/or liftable inner hoods 153 from the progression path of the parts 1.

When lifting cylinder 139 is fully retracted, a flange 213 carried along on its connecting rod engages and operates switch S3 to complete an energizing circuit for solenoid C. Solenoid C, when energized, operates control valve 207 to extend drive cylinder 145 and advance transfer members 8 and 9 along guide wheels 127 so as to index parts 1 forward.

When the drive cylinder 145 is fully extended and parts 1 are accurately positioned above cradle structures 75 at the next successive processing stages, a flange 215 carried on its connecting rod engages and operates the switch S4 to complete an energizing circuit for solenoid D. Solenoid D operates control valve 205 to extend the lifting cylinder 139 and return lift bar 119. When the lift bar 119 is returned, liftable inner hoods 153, if used, and/or doors 25 are lowered concurrently with transfer members 8 and 9. At this time, therefore, the individual parts 1 are received on the cradle structures 75 and washing stages 53, flushing stages 55 and the single blow-off stage 20 are closed off. The transfer phase of the processing cycle is completed.

The active treating phase of the processing cycle is initiated by flange 213 carried on control rod of now-extending lifting cylinder 139 engaging and operating switch S5. Switch S5, when operated, completes energizing paths for solenoids E, F and G, respectively. Solenoid E, when energized, operates control valve 203 to retract valve cylinder 73 to draw the control arms 69 of diverting valves 65 whereby the individual processing stages are activated. Concurrently, solenoids F and G, when energized, operate the control valves 201 and 207, respectively, to extend rotating cylinder 103 and to retract driving cylinder 145, the latter being effective to return transfer bars 8 and 9 to their lower position as shown, preparatory to a next indexing operation.

The operation of rotating cylinder 103, as hereinabove described, causes cradle structures 75 to undergo one or more revolutions, over and back, at each station, whereby the entire surfaces of the parts 1 are exposed to the forceful streams of liquid and then of air directed from the nozzles 57 and 58. Rack motor 103 is advantageously adapted to return when its flange 209, carried on its connecting rod, engages and operates switch S6.

When switch S6 is operated, it completes an energizing circuit for solenoid H which operates control valve 201 to retract the rack motor 103 and again expose the surfaces of parts 1. When the rotating cylinder 103 has retracted, flange member 209 again engages and operates switch S1, as hereinabove described, to extend valve cylinder 73 so as to complete the treating phase of the processing cycle.

Switch S1, on operating, initiates a subsequent indexing phase, like that just described, whereby the part 1 at each station is again advanced into, along and out from chamber S according to their respective positions in the sequence, and causes them to be treated at successive processing stages and finally discharged, fully washed ad dried, from the power washer apparatus through exit port 13.

The power washer apparatus hereinabove described is susceptible of numerous modifications without departing from the spirit and scope of this invention. For example, while cradle structures 75 have been described as stationary during the transfer, it is evident that they may be adapted to vertical motion so as to deliver and receive parts 1 to and from transfer members 8 and 9. In such instance, the cradle structure 75 can be lowered synchronously with the opening of doors 25 to deliver parts 1 onto transfer members 8 and 9; the transfer members 8 and 9, accordingly, need be only horizontally displaceable. When transfer members 8 and 9 have been advanced to index parts 1, the cradles 75 are elevated to pick off parts 1 therefrom and carry them, for example, up within the compartmented processing stages of the apparatus, thereby substantially doing away with the elevating inner hoods 153 at all. Also, while inner hoods 153 of FIGURE 2 have been described as being elevated vertically during each indexing phase, or the same clearance produced by lowering the parts under their edges they may instead be elevated enough for transfer by pivoting about one edge or otherwise displaced so as to allow parts 1 to progress along upper housing 5. Moreover, a single chamber may be provided for the processing stages 15, 17 and 19 and with or without upper housing 5 which can be controlled in any of the aforesaid manners.

Accordingly, as the illustrated embodiments of this invention are susceptible to numerous modifications which will be suggested by the foregoing, it is intended that the patent be commensurate with this invention and the appended claims are drawn to that end.

We claim:

1. Apparatus for processing manufactured parts comprising a base tank, a removable upper housing seated on said base tank and having entry and exit ports, base tank partitions defining the chambers therein, partitions in the upper housing contiguous with the base tank partitions, respectively, with each cooperating therewith to define chambers for a given processing section and having transfer ports therein, which are disposed along a path of travel for said parts, means for impinging streams of liquid against said parts at said processing stages, cradles positioned along a transfer path within said housing to receive and support said parts, respectively, at said processing stages within said chambers, transfer means for advancing parts through the apparatus, door means for sealing all of said ports, flange members extending inwardly and downwardly from the mating rims of the base tank and upper housing, from their partitions, and from the door means, gasket means positioned and pressed between said mated flange members to effect a seal, a plurality of hood structures corresponding, respectively, to said processing stages, and adapted to be positioned over said stages whereby each is substantially isolated during active processing of a part therein, actuating means for elevating and lowering said door means and said hood structures to allow transfer of parts between stages, inactivating means adapted to interrupt operation of said impingement means during the transfer of said parts, rotating means adapted to rotate the cradles while the latter hold the parts in place for overall impingement of the latter by said impinging means, and control means to synchronize the inactivating, actuating, rotating, and transfer means.

2. Apparatus for processing manufactured parts comprising (a) a base tank, (b) an uper housing seated on said base tank and having entry and exit ports, (c) base tank partitions defining chambers therein, (d) partitions in the upper housing contiguous with the base tank partitions, respectively, with each cooperating therewith to define chambers for a given processing section and having transfer ports therein, which are disposed along a path of travel for said parts, (e) means for impinging streams of liquid against said parts within said chambers, (f) transfer means for advancing parts through the apparatus, (g) cradles each positioned along the transfer path at a processing stage to receive and support a part in position for impingement by said streams, (h) door means for sealing all of said ports, (i) actuating means for opening and closing said door means to allow passage of parts through said ports, (j) inactivating means adapted to inhibit the impinging means during the transfer of said parts from chamber to chamber, and (k) control means for timing the sequence of operations of said transfer means, said impingement means, said inactivating means, and said actuating means, so that each operates to effect the appropriate action with respect to the parts when they are respectively in position for such action.

3. Apparatus for processing manufactured parts comprising enclosure means for at least one processing stage, said enclosure means comprising a base tank and an upper housing seated on said base tank and having entry and exit ports, means for impinging liquid against said part at each such processing stage, transfer means for advancing parts through the apparatus, part supports each positioned along the transfer path at a processing stage to receive and support a part in position for impingement by said liquid, door means for sealing said ports, actuating means for opening and closing said door means to allow passage of parts through said ports, and inactivating means adapted to interrupt operation of said impingement means during the transfer of said parts, in which the inactivating means is a diverting valve adapted to divert the flow into a reservoir from which the liquid of said flow was drawn.

4. Apparatus for processing manufactured parts comprising enclosure means for at least one processing stage, said enclosure means comprising a base tank and an upper housing seated on said base tank and having entry and exit ports, means for impinging liquid against said part at each such processing stage, transfer means for advancing parts through the apparatus, part supports each positioned along the transfer path at a processing stage to receive and support a part in position for impingement by said liquid, door means for sealing said ports, actuating means for opening and closing said door means to allow passage of parts through said ports, and inactivating means adapted to interrupt operation of said impingement means during the transfer of said parts, wherein the actuating means and the transfer means are linked and driven simultaneously.

5. Apparatus for processing manufactured parts comprising (a) a base tank, (b) an upper housing seated on said base tank, and having entry and exit ports, (c) base tank partitions defining chambers therein, (d) partitions in the upper housing contiguous with the base tank partitions, respectively, with each cooperating therewith to define chambers for a given processing section and having transfer ports therein, which are disposed along a path of travel for said parts, (e) means for impinging streams of liquid against said parts within said chambers, (f) transfer means for advancing parts through the apparatus, (g) cradles each positioned along the transfer path at a processing stage to receive and support a part in position for impingement by said streams, (h) door means for sealing all of said ports, (i) flange members extending inwardly and downwardly from the mating rims of the base tank and upper housing, from their partitions, and from the door means, (j) gasket means positioned and pressed between said mated flange members to effect a seal, (k) actuating means for opening and closing said door means to allow passage of parts through said ports, (l) inactivating means adapted to inhibit the impinging means during the transfer of said parts from chamber to chamber, and (m) control means for timing the sequence of operations of said transfer means, said impingement means, said inactivating means, and said actuating means, so that each operates to effect the appropriate action with respect to the parts when they are respectively in position for such action.

6. An apparatus as defined in claim 5 which further comprises means for rotating said parts seated in said cradles during exposure to said liquid impingement.

7. Apparatus for processing manufactured parts comprising (a) a base tank, (b) an upper housing seated on said base tank and having entry and exit ports, (c) base tank partitions defining chambers therein, (d) partitions in the upper housing over said base tank partitions, respectively, with each cooperating therewith to define chambers for a given processing section and having transfer ports therein, which are disposed along a path of travel for said parts, (e) means for impinging streams of liquid against said parts within said chambers, (f) transfer means for advancing parts through the apparatus, (g) cradles each positioned along the transfer path at a processing stage to receive and support a part in position for impingement by said streams, (h) door means for sealing all of said ports, (i) a plurality of hood structures corresponding, respectively, to said processing stages, and adapted to be positioned over said stages whereby each is substantially isolated during active processing of a part therein, (j) actuating means for elevating and lowering said door means and said hood structures to allow transfer of parts between stages, (k) inactivating means adapted to inhibit the impinging means during the transfer of said parts from chamber to chamber, and (l) control means for timing the sequence of operations of said transfer means, said impingement means, said inactivating means, and said actuating means, so that each operates to effect the appropriate action with respect to the parts when they are respectively in position for such action.

8. Apparatus for processing manufactured parts such as heavy castings and the like comprising enclosure means for at least one processing stage, said enclosure means comprising a base tank and an upper housing on said base tank and having entry and exit ports, means for impinging liquid against said part at each such processing stage, mechanical transfer means for advancing parts through the apparatus, means for supporting at least one part precisely in position along the transfer path at a processing stage for impingement by said liquid, door means for sealing said ports, actuating means for opening and closing said door means to allow passage of parts through said ports, inactivating means adapted to interrupt operation of said impingement means during the transfer of said parts, flange members extending inwardly and downwardly from the mating rims of said base tank and upper housing and from the door means, and gasket means positioned and pressed between said mated flange members to effect a seal.

9. Apparatus for processing manufactured parts such as heavy castings and the like comprising enclosure means for at least one processing stage, said enclosure means comprising a base tank and a readily removable upper housing tightly seated on said base tank and having entry and exit ports, means for impinging liquid against said part at each such processing stage, transfer means for advancing parts through the apparatus, means for supporting at least one part precisely in position at a processing stage along the transfer path for impingement by said liquid, flange members extending inwardly and downwardly from the mating rims of said base tank and upper housing and from the door means, and gasket means positioned and pressed between said mated flange members to effect a seal.

10. Apparatus for processing manufactured parts such as heavy castings and the like comprising enclosure means for at least one processing stage, said enclosure means comprising a base tank and an upper housing on said base tank and having entry and exit ports, means for impinging liquid against said part at each such processing stage, mechanical transfer means for advancing parts through the apapartus, means for supporting at least one part precisely in position along the transfer path at a processing stage for impingement by said liquid, door means for sealing said ports, actuating means for opening and closing said door means to allow passage of parts through said ports, inactivating means adapted to interrupt operation of said impingement means during the transfer of said parts, which further comprises a plurality of said support means in sequential orientation, a plurality of pinions with shafts each respectively connected to a support means, a plurality of gear racks each respectively engaging a pinion, means for mechanically linking said gear racks, reciprocating means connected to said linking means whereby parts seated in said support means are rotated, and gripping means mounted on each of said support means for securing said part therein during rotation.

11. Apparatus for processing manufactured parts such as heavy castings and the like comprising enclosure means for at least one processing stage, said enclosure means comprising a base tank and an upper housing on said base tank and having entry and exit ports, means for impinging liquid against said part at each such processing stage, mechanical transfer means for advancing parts through the apparatus, means for supporting at least one part precisely in position along the transfer path at a processing stage for impingement by said liquid, door means for sealing said ports, actuating means for opening and closing said door means to allow passage of parts through said ports, inactivating means adapted to interrupt operation of said impingement means during the transfer of said parts, which further comprises a plurality of said support means in sequential orientation, a plurality of pinions, a plurality of pinion shafts, each of said support means being connected to one of said pinion shafts, a plurality of gear racks each respectively engaging one of said pinions, a rack shaft slideably mounted on said apparatus alongside each of said support means and connected to each of said gear racks, a sprocket drive mechanism connected at one end to one of said pinion shafts, a remote rack-and-pinion mechanism connected to the other end of said sprocket drive mechanism, a reciprocating hydraulic motor connected to the rack of said remote rack-and-pinion mechanism, at least one locking pin mounted on each support means and adapted to be pushed into engagement with a part seated therein and to secure said part during rotation, biasing means for disengaging said pins from said parts, and cam plates mounted on said apparatus for engaging said locking pins and camming them into locking engagement during rotation of said parts.

References Cited in the file of this patent
UNITED STATES PATENTS

| | | |
|---|---|---|
| 1,130,015 | Paul | Mar. 2, 1915 |
| 1,255,896 | Lathrop | Feb. 12, 1918 |
| 1,495,473 | Fitzgerald | May 27, 1924 |
| 1,780,772 | Washburne | Nov. 4, 1930 |
| 2,225,946 | Arey | Dec. 24, 1940 |
| 2,258,562 | Arey | Oct. 7, 1941 |
| 2,393,215 | Arey | Jan. 15, 1946 |
| 2,573,787 | Ganahl | Nov. 6, 1951 |
| 2,702,558 | Blanchard | Feb. 22, 1955 |
| 2,949,120 | Federighi | Aug. 16, 1960 |
| 2,988,094 | Ludwig | June 13, 1961 |